US010158666B2

(12) United States Patent
Jalan et al.

(10) Patent No.: US 10,158,666 B2
(45) Date of Patent: Dec. 18, 2018

(54) MITIGATING TCP SYN DDOS ATTACKS USING TCP RESET

(71) Applicant: A10 Networks, Inc., San Jose, CA (US)

(72) Inventors: Rajkumar Jalan, Saratoga, CA (US); Gurudeep Kamat, San Jose, CA (US); Ronald Wai Lun Szeto, San Francisco, CA (US)

(73) Assignee: A10 Networks, Inc., San Jose, CA (US)

( * ) Notice: Subject to any disclaimer, the term of this patent is extended or adjusted under 35 U.S.C. 154(b) by 219 days.

(21) Appl. No.: 15/220,326

(22) Filed: Jul. 26, 2016

(65) Prior Publication Data
US 2018/0034848 A1   Feb. 1, 2018

(51) Int. Cl.
*H04L 29/06* (2006.01)
(52) U.S. Cl.
CPC ...... *H04L 63/1458* (2013.01); *H04L 63/1416* (2013.01); *H04L 63/1425* (2013.01)
(58) Field of Classification Search
CPC ............. H04L 63/0853; H04L 63/1458; H04L 63/1416; H04L 63/1425; H04L 63/1466; H04L 29/06938; H04L 29/12924
See application file for complete search history.

(56) References Cited

U.S. PATENT DOCUMENTS 4,780,905 A   10/1988 Cruts et al.
5,511,122 A    4/1996 Atkinson
5,584,023 A   12/1996 Hsu
5,757,908 A    5/1998 Cooper et al.
5,805,801 A    9/1998 Holloway et al.
5,835,727 A   11/1998 Wong et al.
(Continued)

FOREIGN PATENT DOCUMENTS

TW        I241818 B    10/2005
WO    WO1999048303 A2    9/1999
(Continued)

OTHER PUBLICATIONS

Simpson (TCP Cookie Transaction (TCPCT), RFC: 6013, https://buildbot.tools.ietf.org/html/rfc6013, Jan. 2011, pp. 1-36 (Year: 2011).*
(Continued)

*Primary Examiner* — Eleni A Shiferaw
*Assistant Examiner* — Sher A Khan
(74) *Attorney, Agent, or Firm* — Keith Kline; The Kline Law Firm PC

(57) ABSTRACT

Provided are methods and systems for mitigating a denial of service attack. A system for mitigating a denial of service attack may include a network module, a storage module, and a processor module. The network module may be operable to receive a request from a network device to establish a data connection between the network device and a server based on a determination that the network device is trusted. The storage module may be operable to store a whitelist associated with a plurality of trusted network devices. The processor module may be operable to determine that the network device is trusted. Based on the determination, the processor module may associate the network device with the whitelist for a predetermined period of time.

16 Claims, 9 Drawing Sheets

(56) References Cited

U.S. PATENT DOCUMENTS

| | | | |
|---|---|---|---|
| 5,892,903 A | 4/1999 | Klaus | |
| 5,905,859 A | 5/1999 | Holloway et al. | |
| 6,006,272 A | 12/1999 | Aravamudan et al. | |
| 6,170,061 B1 | 1/2001 | Beser | |
| 6,185,681 B1 | 2/2001 | Zizzi | |
| 6,219,706 B1 | 4/2001 | Fan et al. | |
| 6,249,866 B1 | 6/2001 | Brundrett et al. | |
| 6,259,789 B1 | 7/2001 | Paone | |
| 6,347,376 B1 | 2/2002 | Attwood et al. | |
| 6,363,486 B1 | 3/2002 | Knapton, III | |
| 6,505,192 B1 | 1/2003 | Godwin et al. | |
| 6,539,435 B2 | 3/2003 | Bolmarcich et al. | |
| 6,553,005 B1 | 4/2003 | Skirmont et al. | |
| 6,578,147 B1 | 6/2003 | Shanklin et al. | |
| 6,735,702 B1 | 5/2004 | Yavatkar et al. | |
| 6,973,040 B1 | 12/2005 | Ricciulli | |
| 7,051,369 B1* | 5/2006 | Baba | H04L 63/02 |
| | | | 726/22 |
| 7,092,357 B1 | 8/2006 | Ye | |
| 7,200,760 B2 | 4/2007 | Riebe et al. | |
| 7,221,757 B2 | 5/2007 | Alao | |
| 7,234,161 B1 | 6/2007 | Maufer et al. | |
| 7,277,963 B2 | 10/2007 | Dolson et al. | |
| 7,372,809 B2 | 5/2008 | Chen et al. | |
| 7,409,712 B1 | 8/2008 | Brooks et al. | |
| 7,478,429 B2 | 1/2009 | Lyon | |
| 7,533,409 B2 | 5/2009 | Keane et al. | |
| 7,596,695 B2 | 9/2009 | Liao et al. | |
| 7,620,733 B1 | 11/2009 | Tzakikario et al. | |
| 7,739,494 B1 | 6/2010 | McCorkendale et al. | |
| 7,823,194 B2 | 10/2010 | Shay | |
| 7,845,004 B2 | 11/2010 | Bardsley et al. | |
| 7,925,766 B2 | 4/2011 | Jayawardena et al. | |
| 7,953,855 B2 | 5/2011 | Jayawardena et al. | |
| 8,010,469 B2 | 8/2011 | Kapoor et al. | |
| 8,089,871 B2 | 1/2012 | Iloglu et al. | |
| 8,276,203 B2 | 9/2012 | Nakhre et al. | |
| 8,286,227 B1 | 10/2012 | Zheng | |
| 8,375,453 B2 | 2/2013 | Jackson et al. | |
| 8,719,446 B2 | 5/2014 | Spatscheck et al. | |
| 8,881,284 B1 | 11/2014 | Gabriel | |
| 8,948,380 B2 | 2/2015 | Goto | |
| 9,129,116 B1 | 9/2015 | Wiltzius | |
| 9,130,996 B1 | 9/2015 | Martini | |
| 9,245,121 B1 | 1/2016 | Luo et al. | |
| 9,246,926 B2 | 1/2016 | Erlingsson et al. | |
| 9,294,503 B2 | 3/2016 | Thompson et al. | |
| 9,300,623 B1 | 3/2016 | Earl et al. | |
| 9,537,886 B1 | 1/2017 | Gareau | |
| 9,584,318 B1 | 2/2017 | Yang et al. | |
| 9,749,354 B1* | 8/2017 | Diggins | H04L 63/1458 |
| 2002/0103916 A1* | 8/2002 | Chen | H04L 43/00 |
| | | | 709/229 |
| 2002/0108059 A1 | 8/2002 | Canion et al. | |
| 2002/0165912 A1 | 11/2002 | Wenocur et al. | |
| 2003/0023876 A1 | 1/2003 | Bardsley et al. | |
| 2003/0035547 A1 | 2/2003 | Newton | |
| 2003/0123667 A1 | 7/2003 | Weber et al. | |
| 2003/0135625 A1* | 7/2003 | Fontes | H04L 63/12 |
| | | | 709/228 |
| 2004/0034773 A1* | 2/2004 | Balabine | A63F 13/12 |
| | | | 713/168 |
| 2004/0057579 A1 | 3/2004 | Fahrny | |
| 2004/0091114 A1 | 5/2004 | Carter et al. | |
| 2004/0148520 A1 | 7/2004 | Talpade et al. | |
| 2004/0172538 A1 | 9/2004 | Satoh et al. | |
| 2004/0187032 A1 | 9/2004 | Gels et al. | |
| 2005/0039104 A1* | 2/2005 | Shah | H04L 69/22 |
| | | | 714/776 |
| 2005/0044352 A1 | 2/2005 | Pazi et al. | |
| 2005/0125684 A1 | 6/2005 | Schmidt | |
| 2005/0144279 A1* | 6/2005 | Wexelblat | G06Q 30/06 |
| | | | 709/225 |
| 2005/0180416 A1 | 8/2005 | Jayawardena et al. | |
| 2005/0193199 A1 | 9/2005 | Asokan et al. | |
| 2005/0198099 A1 | 9/2005 | Motsinger et al. | |
| 2005/0235145 A1 | 10/2005 | Slick et al. | |
| 2005/0278527 A1 | 12/2005 | Liao et al. | |
| 2006/0179319 A1 | 8/2006 | Krawczyk | |
| 2006/0185014 A1 | 8/2006 | Spatscheck et al. | |
| 2006/0230444 A1 | 10/2006 | Iloglu et al. | |
| 2006/0253603 A1* | 11/2006 | Clark | H04L 63/1458 |
| | | | 709/237 |
| 2007/0022479 A1* | 1/2007 | Sikdar | H04L 63/0218 |
| | | | 726/22 |
| 2007/0143769 A1 | 6/2007 | Bu et al. | |
| 2007/0169194 A1 | 7/2007 | Church et al. | |
| 2007/0186282 A1 | 8/2007 | Jenkins | |
| 2007/0214088 A1 | 9/2007 | Graham et al. | |
| 2007/0280114 A1 | 12/2007 | Chao et al. | |
| 2007/0283429 A1 | 12/2007 | Chen et al. | |
| 2009/0077663 A1 | 3/2009 | Sun et al. | |
| 2009/0083537 A1 | 3/2009 | Larsen et al. | |
| 2010/0131646 A1 | 5/2010 | Drako | |
| 2010/0138921 A1 | 6/2010 | Na et al. | |
| 2011/0188452 A1 | 8/2011 | Borleske et al. | |
| 2011/0252469 A1* | 10/2011 | Cho | H04L 63/0236 |
| | | | 726/13 |
| 2011/0282997 A1 | 11/2011 | Prince et al. | |
| 2012/0096546 A1 | 4/2012 | Dilley et al. | |
| 2012/0144461 A1 | 6/2012 | Rathbun | |
| 2012/0155274 A1 | 6/2012 | Wang et al. | |
| 2012/0159623 A1 | 6/2012 | Choi | |
| 2012/0170753 A1 | 7/2012 | Pandrangi et al. | |
| 2012/0173684 A1 | 7/2012 | Courtney et al. | |
| 2012/0174196 A1 | 7/2012 | Bhogavilli et al. | |
| 2012/0227109 A1 | 9/2012 | Dimuro | |
| 2012/0250866 A1 | 10/2012 | Matsuo | |
| 2012/0260329 A1* | 10/2012 | Suffling | H04L 63/104 |
| | | | 726/9 |
| 2012/0266242 A1 | 10/2012 | Yang et al. | |
| 2012/0311664 A1* | 12/2012 | Elrod | H04L 63/0227 |
| | | | 726/1 |
| 2013/0103834 A1 | 4/2013 | Dzerve et al. | |
| 2013/0133045 A1* | 5/2013 | Hayes | H04L 63/08 |
| | | | 726/5 |
| 2013/0198845 A1 | 8/2013 | Anvari | |
| 2013/0227646 A1 | 8/2013 | Haggerty et al. | |
| 2013/0243194 A1 | 9/2013 | Hawkes et al. | |
| 2013/0263256 A1 | 10/2013 | Dickinson et al. | |
| 2013/0291107 A1* | 10/2013 | Marck | G06F 21/316 |
| | | | 726/23 |
| 2014/0325648 A1 | 10/2014 | Liu et al. | |
| 2014/0344925 A1 | 11/2014 | Muthiah | |
| 2015/0058977 A1 | 2/2015 | Thompson et al. | |
| 2015/0143118 A1 | 5/2015 | Sheller et al. | |
| 2015/0220745 A1 | 8/2015 | Nellitheertha et al. | |
| 2015/0281177 A1* | 10/2015 | Sun | H04L 63/1458 |
| | | | 726/11 |
| 2015/0365378 A1* | 12/2015 | Kim | H04L 63/0245 |
| | | | 726/13 |
| 2016/0036651 A1 | 2/2016 | Sureshchandra et al. | |
| 2016/0134655 A1 | 5/2016 | Thompson et al. | |
| 2016/0182509 A1 | 6/2016 | Kantecki et al. | |
| 2016/0226896 A1 | 8/2016 | Bhogavilli et al. | |

FOREIGN PATENT DOCUMENTS

| | | |
|---|---|---|
| WO | WO2000062167 A1 | 10/2000 |
| WO | WO2006039529 A2 | 4/2006 |
| WO | WO2015030977 A1 | 3/2015 |

OTHER PUBLICATIONS

Spatscheck et al., "Optimizing TCP Forwarder Performance", IEEE/ACM Transactions on Networking, vol. 8, No. 2, Apr. 2000, pp. 146-157.

Mutz, Marc, "Linux Encryption HOWTO," Oct. 4, 2000, available at URL: <http://encryptionhowto.sourceforge.net/Encryption-HOWTO-1.html>, 49 pages.

(56) References Cited

OTHER PUBLICATIONS

Obimo et al., "A parallel algorithm for determining the inverse of a matrix for use in blockcipher encryption/decryption," Journal of Supercomputing, vol. 39, No. 2, pp. 113-130, Feb. 27, 2007.

Long et al., "ID-based threshold decryption secure against adaptive chosen-ciphertext attack," Computers and Electrical Engineering, vol. 33, No. 3, pp. 166-176, May 2007.

Popek, Gerald J. et al., "Encryption and Secure Computer Networks," Computing Surveys, vol. 11, No. 4, pp. 331-356, Dec. 1979.

Liebergeld, Steffen et al., "Cellpot: A Concept for Next Generation Cellular Network Honeypots," Internet Society, Feb. 23, 2014, pp. 1-6.

Lee, Patrick P. C. et al., "On the Detection of Signaling DoS Attacks on 3G Wireless Networks," IEEE INFOCOM 2007—26th IEEE International Conference on Computer Communications proceedings, May 6-12, 2007, pp. 1289-1297.

Thanasegaran et al., "Simultaneous Analysis of Time and Space for Conflict Detection in Time-Based Firewall Policies," Jul. 2010, IEEE 10th International Conference on Computer and Information Technology, pp. 1015-1021.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

"Network- vs. Host-based Intrusion Detection, a Guide to Intrusion Detection Technology", Oct. 2, 1998, Internet Security Systems [online], Retreived from the Internet: <URL:http://documents.iss.net/whitepapers/nvh-ids.pdf>, 10 pages.

Hunt, Guerney D. H. et al., "Network Dispatcher: a connection router for scalable Internet services", 1998, Proceedings of the 7th International World Wide Web Conference (WWW7), Retrieved from the Internet: <URL:http://www.unizh.ch/home/mazzo/reports/www7conf/fullpapers/1899/com1899.htm>, 14 pages.

* cited by examiner

MITIGATING TCP SYN DDOS ATTACKS USING TCP RESET

TECHNICAL FIELD

This disclosure relates generally to data networks and, more specifically, to systems and methods for mitigating a Transmission Control Protocol (TCP) Synchronization (SYN) Distributed Denial-Of-Service (DDOS) attack using a TCP reset.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Typically, a data connection between a client and a server is established using a TCP with a three-way handshake. Typically, a three-way handshake procedure is used to synchronize and establish a TCP connection between a client and a server. More specifically, during the three-way handshake procedure, the client initiates the TCP connection by sending a synchronization (SYN) packet to the server. The server acknowledges receipt of the SYN packet by sending a SYN acknowledgement (ACK) packet to the client. Upon receipt of the SYN ACK packet from the server, the client responds with an acknowledgement (ACK) packet, thereby concluding the three-way handshake procedure.

In many cases, the data connection between the client and the server is established through a middle network appliance, such as a load balancer or a security appliance within the server side infrastructure. Server side network appliances may optimize performance and protect the server from unwanted data traffic.

Many existing threat protection systems employed in the network appliances addressing denial of service attacks (DOS and DDOS) use methods based on generating a TCP SYN/ACK cookie to validate a client (also referred to herein as a network device). The TCP SYN/ACK cookie may include a TCP sequence number, which the server sends to the client in a TCP SYN+ACK packet and expects to receive back from the client in the ACK response packet to validate the client and establish a secure communication. Using a traditional TCP SYN/ACK cookie method, the network device can send a synchronization request (SYN), which can be intercepted by the network appliance associated with the server. The network appliance can respond back with a SYN Acknowledgement (SYN ACK), which can include a cookie so that the server is completely unburdened while the connection is being established. A non-attacker network device normally responds back to a SYN ACK, while an attacker network device generates SYN flags but does not proceed to finalize the three-way handshake process.

If the network device responds to the SYN ACK, the network appliance can validate the cookie received back from the network device, generate a new SYN (without cookies), and send it to the server. Therefore, upon successful validation of the network device, there are two TCP connections, one between the network device and the network appliance and another between the network appliance and the server, where the network appliance acts as a proxy and transfers data packets between the two devices.

There is a mode of deployment called direct server return, which is used in the middle network appliances. Using this mode, packets from the network device to the server are transferred through the network appliance, but packets from the server to the network device are not directed through the network appliance in the middle. This is usually used in cases where the traffic from the server to the network device is much higher than the traffic from the network device to the server. Unfortunately, the direct return mode is not possible with traditional TCP SYN/ACK cookie methods because they require constant two-way communications between the network device and the network appliance. Therefore, the network appliance may become a bottleneck for the packets traveling from the server to the network device and introduce more latency than can be tolerated. There is no existing technology to combine the traditional SYN cookie protection with the direct server return mode.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to systems and methods for mitigating a denial of service attack. According to one embodiment of the disclosure, a system may include a network module operable to receive a request from a network device to establish a data connection between the network device and a server. The network module may be further operable to establish the data connection between the network device and the server based on a determination that the network device is trusted. The system may further include a storage module operable to store a whitelist associated with a plurality of trusted network devices. The system may further include a processor module operable to determine that the network device is trusted. Based on the determination, the processor module may be further operable to associate the network device with the whitelist for a predetermined period of time.

In another embodiment of the disclosure, a method for mitigating a denial of service attack is provided. The method may commence with receiving, by a network appliance, a request from a network device to establish a data connection with a server. The method may continue with determining, by the network appliance, that the network device is trusted. Responsive to the determination, the method may include whitelisting, by the network appliance, the network device for a predetermined period of time. The method may further include establishing, by the network appliance, the data connection between the network device and the server.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
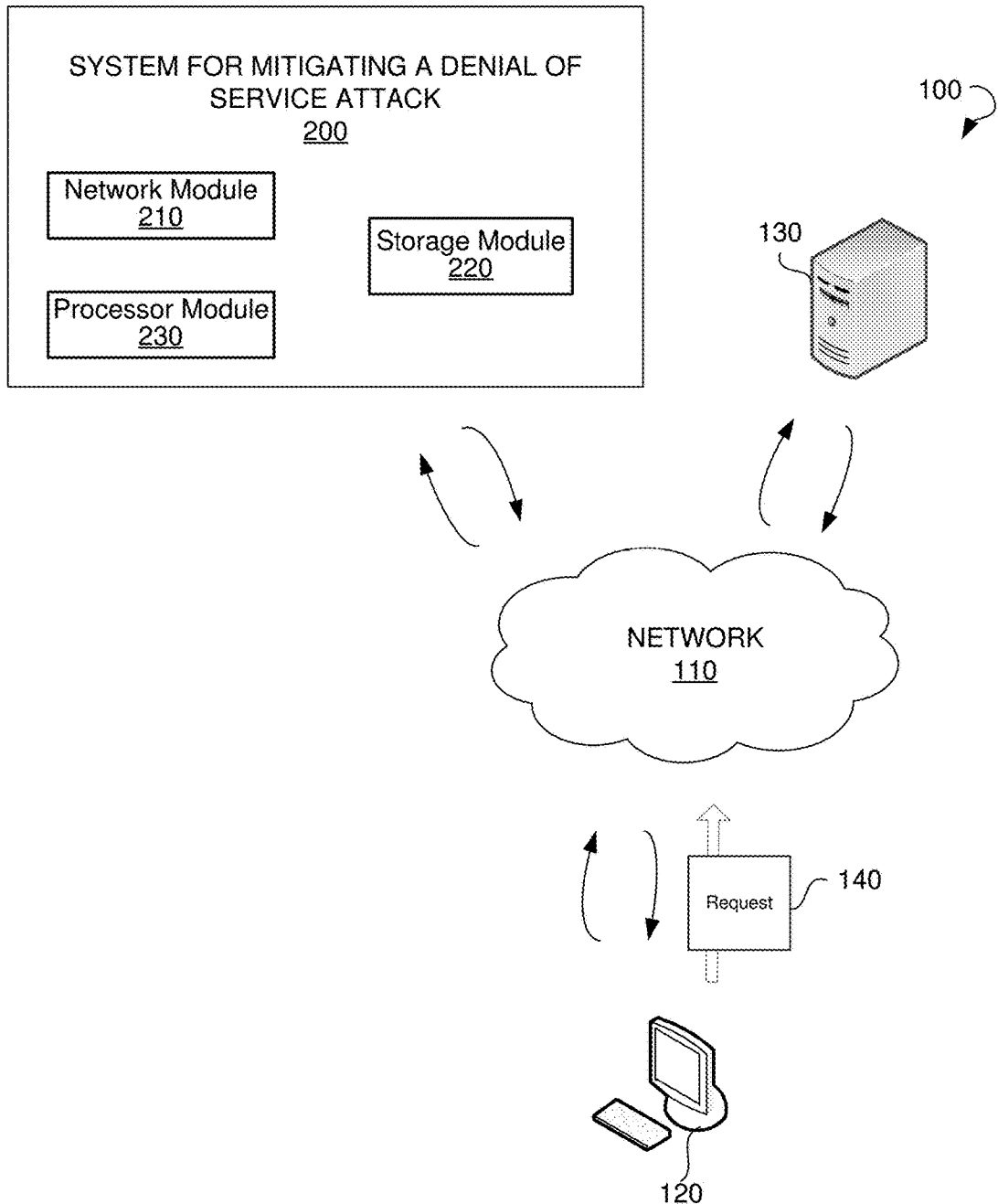
FIG. 1 shows an environment, within which methods and systems for mitigating a denial of service attack can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The present disclosure relates to methods and systems for mitigating a TCP SYN DDoS attack using a TCP reset. The methods and systems can allow employing a TCP reset command as part of a threat protection system of a network appliance in a direct server return mode. In the direct server return mode, packets are transferred from a network device to a server through a network appliance located in the middle between the server and the network device but packets from the server to the network device are not directed through the network appliance. The direct server return mode can be used where traffic from the server to the network device is much higher than the traffic from the network device to the server, where the network appliance becomes a bottleneck and decreases data traffic capacity or introduces more latency than can be tolerated.

According to one embodiment of the disclosure, the network device generates a SYN request to establish a TCP connection to the server. The network appliance intercepts the SYN request and generates a SYN ACK with a cookie. A non-attacker network device normally validates the SYN ACK with the cookie and sends back an ACK with the cookie, while an attacker does not. If the network device is successfully validated, the network appliance labels the network device as trusted, whitelists the network device for a predetermined period of time, and sends a TCP reset command back to the network device.

The whitelisting means that when the same network device generates a SYN request during the predetermined period, the network appliance recognizes the network device as trusted and establishes the TCP connection between the network device and the server using the direct server return mode to send packets from the server directly to the network device for the predetermined period of time (for example, 10 minutes). Specifically, the network appliance forwards the SYN request received from the network device to the server and the server responds directly to the network device with the SYN ACK. The network device responds to the SYN ACK by sending a network device ACK, which may be received by the network appliance and directed to the server. When the whitelisting session expires, the network device becomes untrusted again so that the network device is required to go through the cookie verification process again if it attempts to establish another TCP connection.

According to another embodiment of the method of current disclosure, a network device can generate a SYN request to establish a TCP connection to a server. The network appliance can intercept the SYN and generate a SYN ACK. The SYN ACK may include a sequence number not expected by the network device. As a result, upon receipt of the SYN ACK with the sequence number, the network device can view the response from the network appliance as an invalid/stale response and can send a TCP reset command to the network appliance in order to reestablish the connection. Since an attacker device normally does not respond to SYN ACKs, only a non-attacker network device can send back the TCP reset. If the TCP reset from the network device is received, then the network appliance can label the network device as trusted and whitelist the network device for a predetermined period of time.

When the whitelisted network device generates the new SYN request during the predetermined period, the network appliance recognizes the network device as trusted and establishes a connection between the network device and the server using direct server return mode for data packets traveling from the server to the network device for the predetermined period of time (for example, 10 minutes). Specifically, the network appliance forwards the SYN request received from the network device to the server and the server responds directly to the network device with the SYN ACK. The network device responds to the SYN ACK by sending a network device ACK, which may be received by the network appliance and directed to the server. When the whitelisting session expires, the network device becomes untrusted and establishes a new TCP connection, and the network appliance may again respond to the network device with a SYN ACK having a sequence number that the network device does not expect.

Referring now to the drawings, FIG. 1 illustrates an environment 100 within which methods and systems for mitigating a denial of service attack can be implemented. The environment 100 may include a network 110, a client 120, a server 130, and a system 200 for mitigating a denial of service attack. The client 120 may include a network device or a network resource that sends a request 140, such as a SYN request, for initiating a secure session with the server 130. The client 120 may communicate with the server 130 using the network 110.

The network 110 may include the Internet or any other network capable of communicating data between devices. Suitable networks may include or interface with any one or more of, for instance, a local intranet, a Personal Area Network (PAN), a Local Area Network (LAN), a Wide Area Network (WAN), a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34 bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The network 110 may include a network of network appliances that are interconnected for the purpose of data communication.

The system 200 for mitigating a denial of service attack may include a network module 210, a storage module 220, and a processor module 230, which may be located in the path between the client 120 and server 130 and may be configured to intercept the request 140. Upon receiving the request 140 and performing a verification process, the network module 210 may establish a secure session between the client 120 and the server 130. The network module 210 may be communicatively connected to the storage module 220 that may store a whitelist associated with a plurality of trusted clients and the server 130. Establishing and securing of a data connection is described in further detail below.

Figure 2:
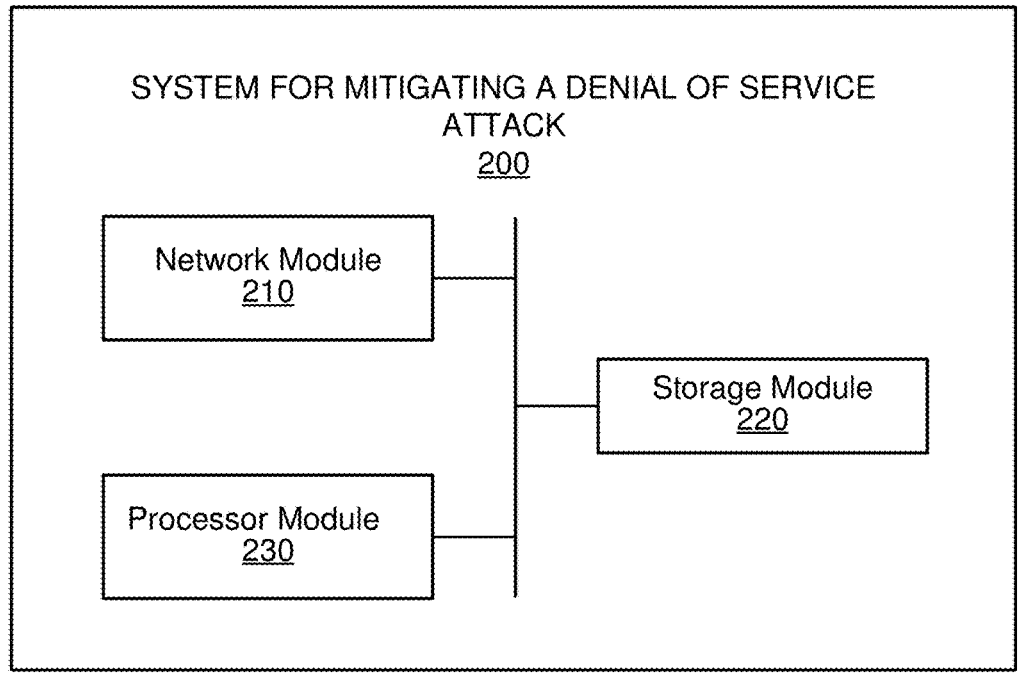
FIG. 2 is a block diagram of a system for mitigating a denial of service attack.

FIG. 2 is a block diagram of a system 200 for mitigating a denial of service attack. The system 200 can include a network module 210, a storage module 220, and a processor module 230. The network module 210 may be operable to receive a request from a network device to establish a data connection between the network device and a server. The processor module 230 may be operable to determine that the network device is trusted. The storage module 220 may be operable to store a whitelist associated with a plurality of trusted network devices. Based on the determination that the network device is trusted, the processor module 230 may be operable to associate the network device with the whitelist for a predetermined period of time. Based on the determination that the network device is trusted, the network module 210 may be operable to establish the data connection between the network device and the server.

In an example embodiment, during the determining that the network device is trusted, the processor module 230 may be operable to generate a SYN cookie. The network module 210 may be operable to transmit a SYN acknowledgement (ACK) including the SYN cookie to the network device. Responsive to the SYN ACK, the network module 210 may be operable to receive a network device ACK from the network device. Lack of the network device ACK is indicative of the network device being untrusted. The processor module 230 may be operable to determine that the network device ACK includes the SYN cookie. Based on the determining, the processor module 230 may be operable to validate authenticity of the SYN cookie.

In an example embodiment, during the establishing of the data connection between the network device and the server, the network module 210, based on the determination that the network device is trusted, may be operable to transmit a TCP reset command to the network device, with the TCP reset command instructing the network device to terminate the TCP session and to start a new TCP session. The network module 210 may be operable to receive from the network device a further synchronization (SYN) request to establish the new TCP session. The processor module 230 may be operable to determine that the network device is whitelisted. Based on the determination, the network module 210 may be operable to establish a trusted data connection between the network device and the server for the predetermined period of time.

In an example embodiment, during the determining that the network device is trusted, the network module 210 may be operable to transmit to the network device a reset cookie. The reset cookie may include a SYN acknowledgement (ACK), with the ACK including an identifier unexpected by the network device and operable to cause the network device to terminate the data connection and to establish a new data connection. Responsive to the reset cookie, the network module 210 may be operable to receive from the network device a reset command, with the reset command being generated responsive to the unexpected identifier. The network module 210 may be operable to determine, based on a receipt of the reset command, that the network device is trusted.

In an example embodiment, the establishing of the data connection between the network device and the server for the predetermined period of time may include receiving, by the network module 210, a further SYN request from the network device. Based on the determination that the network device is trusted, the network module 210 may send the further SYN request to the server. The server may be operable to receive the further SYN request and send a SYN ACK directly to the network device in response to the further SYN request. The network device may respond to the SYN ACK by sending the ACK. The network module 210 may be operable to receive the ACK from the network device and direct the ACK to the server. Thus, the network module 210 may be operable to establish the data connection between the network device and the server for the predetermined period of time. The processor module 230 may be further operable to determine that the predetermined period of time has expired.

Figure 3:
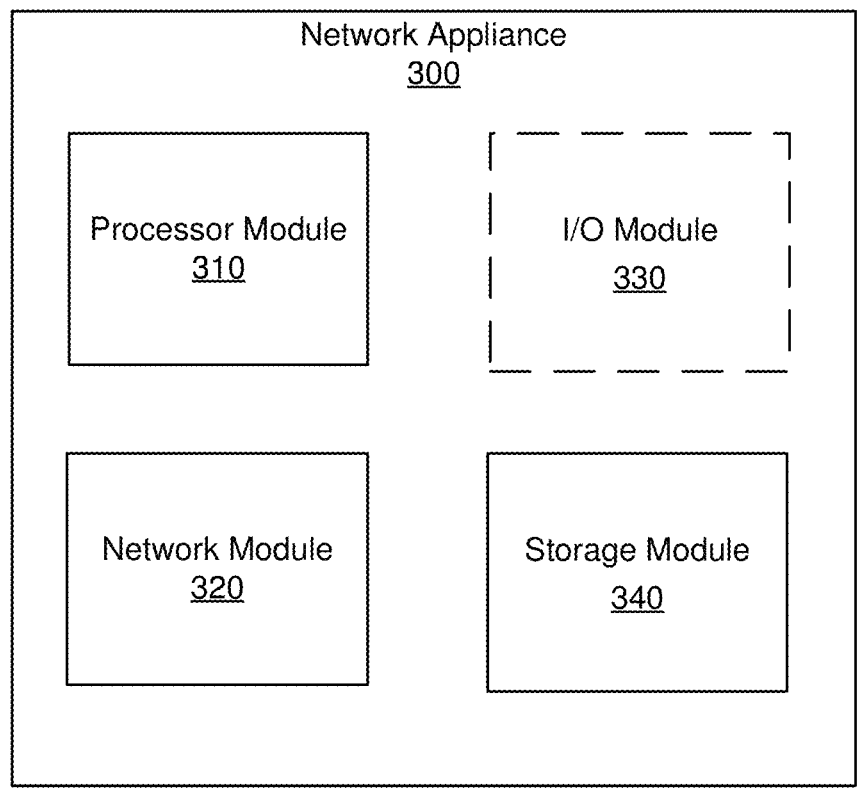
FIG. 3 is a block diagram showing components of a network appliance.

FIG. 3 is a block diagram illustrating a network appliance, according to an example embodiment. In an example embodiment, a network module, a storage module, and a processor module of a system for mitigating a denial of service attack may be implemented in a single module, such as a network appliance 300 shown on FIG. 3. In an example embodiment, the network appliance 300 may be implemented in a form of a network computer and may be a security gateway, a client device, or a server device. In a further example embodiment, the network appliance 300 may be configured as a physical device or a virtual machine. In an example embodiment, the network appliance 300 may include a processor module 310, a network module 320, and a storage module 330.

In an example embodiment, the processor module 310 may include one or more processors which may be a micro-processor, an Intel processor, an Advanced Micro Devices processor, a Microprocessor without Interlocked Pipeline Stages processor, an ARM (advanced RISC machine)-based processor, or a Reduced Instruction Set Computer processor. In an example embodiment, the processor module 310 may include one or more processor cores embedded in a processor. In further example embodiments, the processor module 310 may include one or more embedded processors, or embedded processing elements in a Field Programmable Gate Array, an ASIC, or Digital Signal Processor. In an example embodiment, the network module 320 may include a network interface, such as Ethernet, optical network interface, a wireless network interface, T1/T3 interface, a WAN or LAN interface. In a further example embodiment, the network module 320 may include a network processor.

In an example embodiment, the storage module 340 may include Random Access Memory (RAM), Dynamic Random Access Memory, Static Random Access Memory, Synchronous Dynamic Random Access Memory, or memory utilized by the processor module 310 or the network module 320. In an example embodiment, the storage module 340 may store data utilized by the processor module 310. In an example embodiment, the storage module 340 may include a hard disk drive, a solid state drive, an external disk, a digital versatile disc, a compact disk, or a readable external disk. The storage module 340 may store one or more computer programming instructions which, when executed by the processor module 310 or network module 320, can implement one or more of the functionality of the methods and systems for caching network generated security certificates described herein.

In an example embodiment, the network appliance 300 may optionally include an input/output (I/O) module 330, which may include a keyboard, a keypad, a mouse, a gesture based input sensor, a microphone, a physical or sensory input peripheral, a display, a speaker, or a physical or sensual output peripheral.

Figure 4:
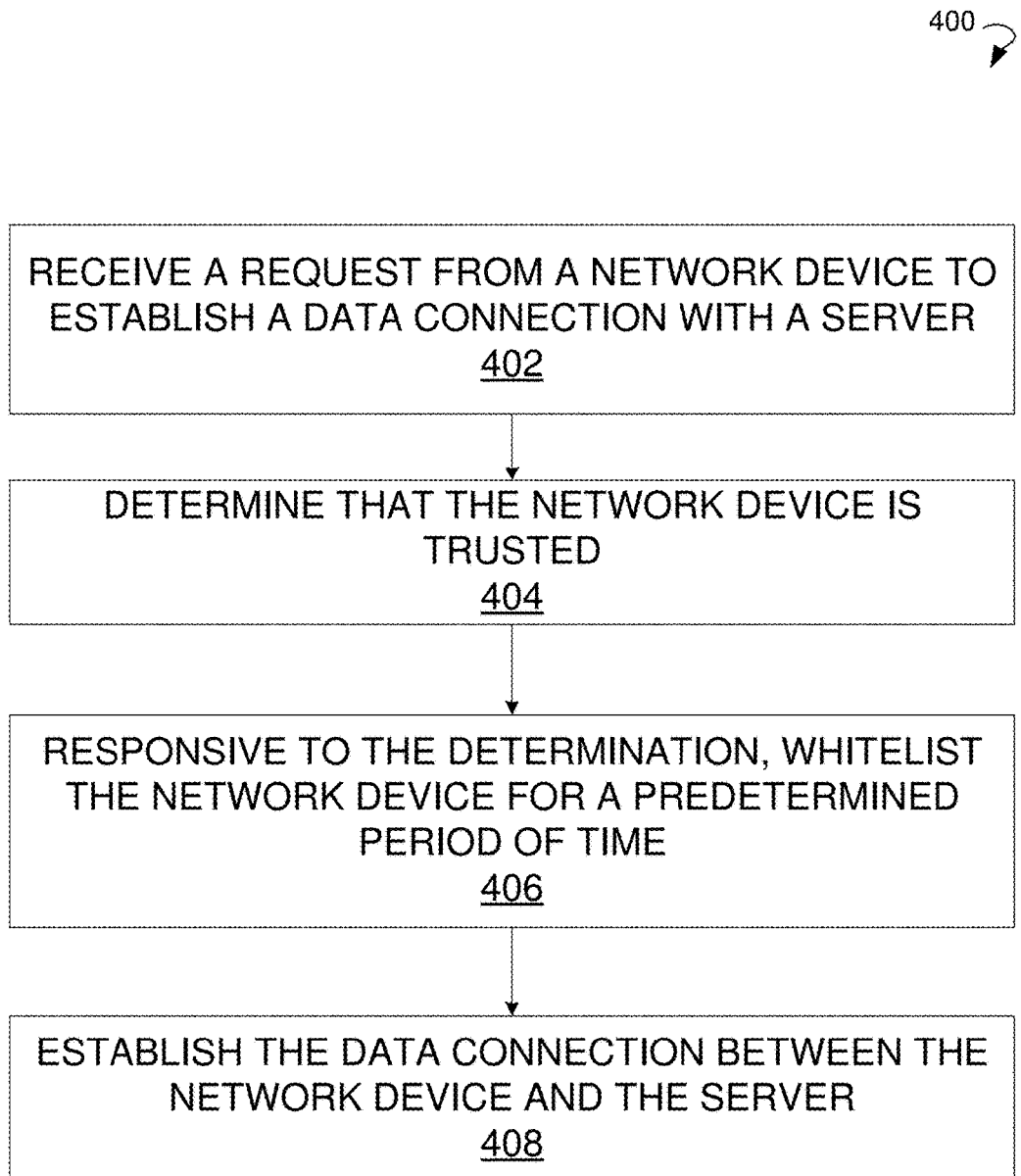
FIG. 4 is a process flow diagram showing a method for mitigating a denial of service attack.

FIG. 4 is a flow diagram showing operations of a method 400 for mitigating a denial of service attack, according to an example embodiment. In some embodiments, the steps may be combined, performed in parallel, or performed in a different order. The method 400 may also include additional or fewer steps than those illustrated.

The method 400 can commence with receiving, by a network appliance, a request from a network device to establish a data connection with a server at operation 402. In an example embodiment, the request from the network device may include an initial synchronization (SYN) request to establish a TCP session between the network device and a server.

At operation 404, the network appliance can determine that the network device is trusted. The specific operations performed for determining that the network device is trusted are described in detail with reference to FIG. 5 and FIG. 6.

Responsive to the determination that the network device is trusted, the network appliance may whitelist the network device for a predetermined period of time at operation 406. At operation 408, the network appliance may establish, based on the whitelisting of the network device, the data connection between the network device and the server. When the data connection is established, the method 400 may further include directing, by the network appliance, return data packets from the server directly to the network device without being processed by the network appliance.

In an example embodiment, the method 400 may further include determining, by the network appliance, that the predetermined period of time has expired. Based on the determination, the network appliance may remove the network device from a whitelist, thereby flagging the network device as untrusted.

Figure 5:
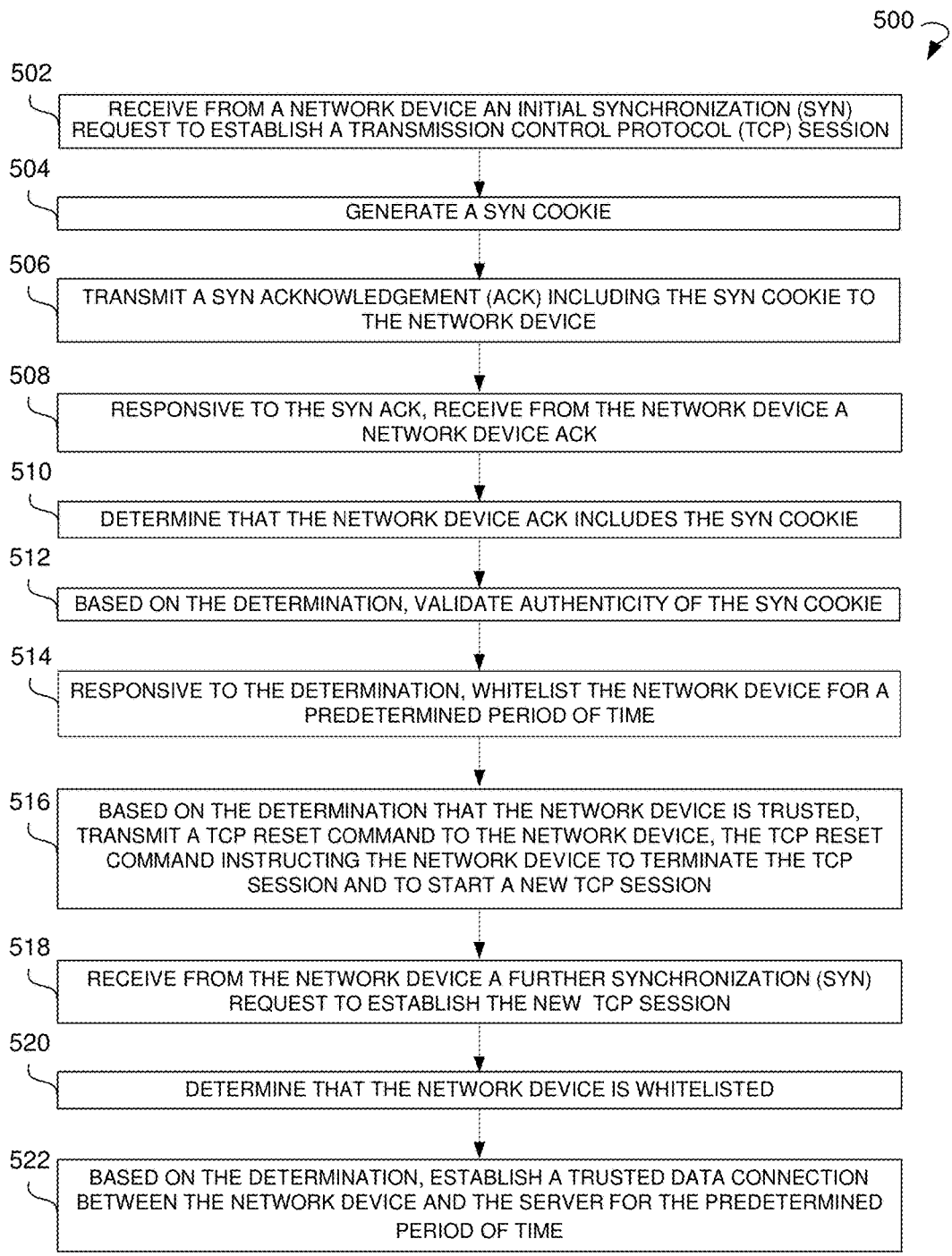
FIG. 5 is a process flow diagram showing a method for mitigating a denial of service attack.

FIG. 5 is a flow diagram showing operations of a method 500 for mitigating a denial of service attack, according to an example embodiment. In some embodiments, the steps may be combined, performed in parallel, or performed in a different order. The method 500 may also include additional or fewer steps than those illustrated.

The method 500 can commence with receiving, by a network appliance from a network device, an initial synchronization (SYN) request to establish a TCP session at operation 502. At operation 504, the network appliance can generate a SYN cookie. The SYN cookie includes an encryption of an identifier associated with the SYN. The network appliance can transmit a SYN acknowledgement (ACK) including the SYN cookie to the network device at operation 506. Responsive to the SYN ACK, the network appliance can receive, from the network device, a network device ACK at operation 508. At operation 510, the network appliance can determine that the network device ACK includes the SYN cookie. Based on the determination, the network appliance can validate authenticity of the SYN cookie at operation 512. Responsive to the determination, the network appliance may whitelist the network device for a predetermined period of time at operation 514. The network module does not send SYN cookies to the network device while the network device is whitelisted. Based on the determination that the network device is trusted, the network appliance can transmit a TCP reset command to the network device, with the TCP reset command instructing the network device to terminate the TCP session and to start a new TCP session at operation 516. At operation 518, the network appliance can receive a further synchronization (SYN) request to establish the new TCP session. At operation 520, the network appliance can determine that the network device is whitelisted. Based on the determination, the network appliance can establish a trusted data connection between the network device and the server for the predetermined period of time at operation 522.

Figure 6:
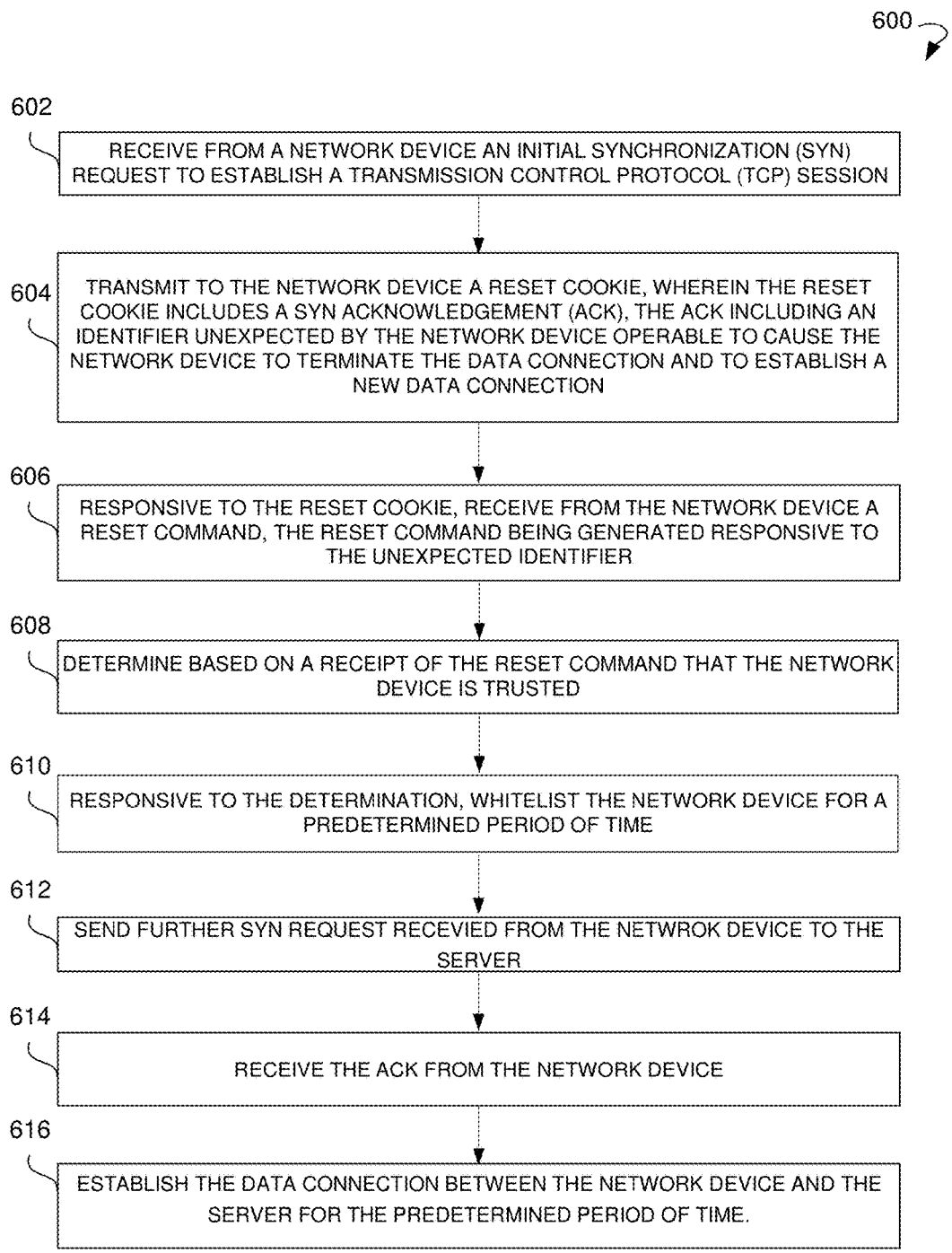
FIG. 6 is a process flow diagram showing a method for mitigating a denial of service attack.

FIG. 6 is a flow diagram showing operations of a method 600 for mitigating a denial of service attack, according to example embodiment. In some embodiments, the steps may be combined, performed in parallel, or performed in a different order. The method 600 may also include additional or fewer steps than those illustrated.

The method 600 can commence with receiving, by a network appliance from a network device an initial synchronization (SYN) request to establish a TCP session at operation 602. At operation 604, the network appliance can transmit a reset cookie to the network device. The reset cookie may include a SYN acknowledgement (ACK), with the ACK including an identifier unexpected by the network device and operable to cause the network device to terminate the data connection and to establish a new data connection. Responsive to the reset cookie, the network appliance can receive, from the network device, a reset command, with the reset command being generated responsive to the unexpected identifier at operation 606. At operation 608, the network appliance can determine that the network device is trusted based on a receipt of the reset command. Responsive to the determination, the network appliance may whitelist the network device for a predetermined period of time at operation 610. When a further SYN request is received by the network appliance from the network device, the network appliance can send the further SYN request to the server at operation 612. The server may respond directly to the network device by sending a SYN ACK to the network device. The network device may respond to the server by sending an ACK. At operation 614, the network appliance can receive the ACK from the network device and direct the ACK to the server. The network appliance can establish the data connection between the network device and the server for the predetermined period of time at operation 616.

Figure 7:
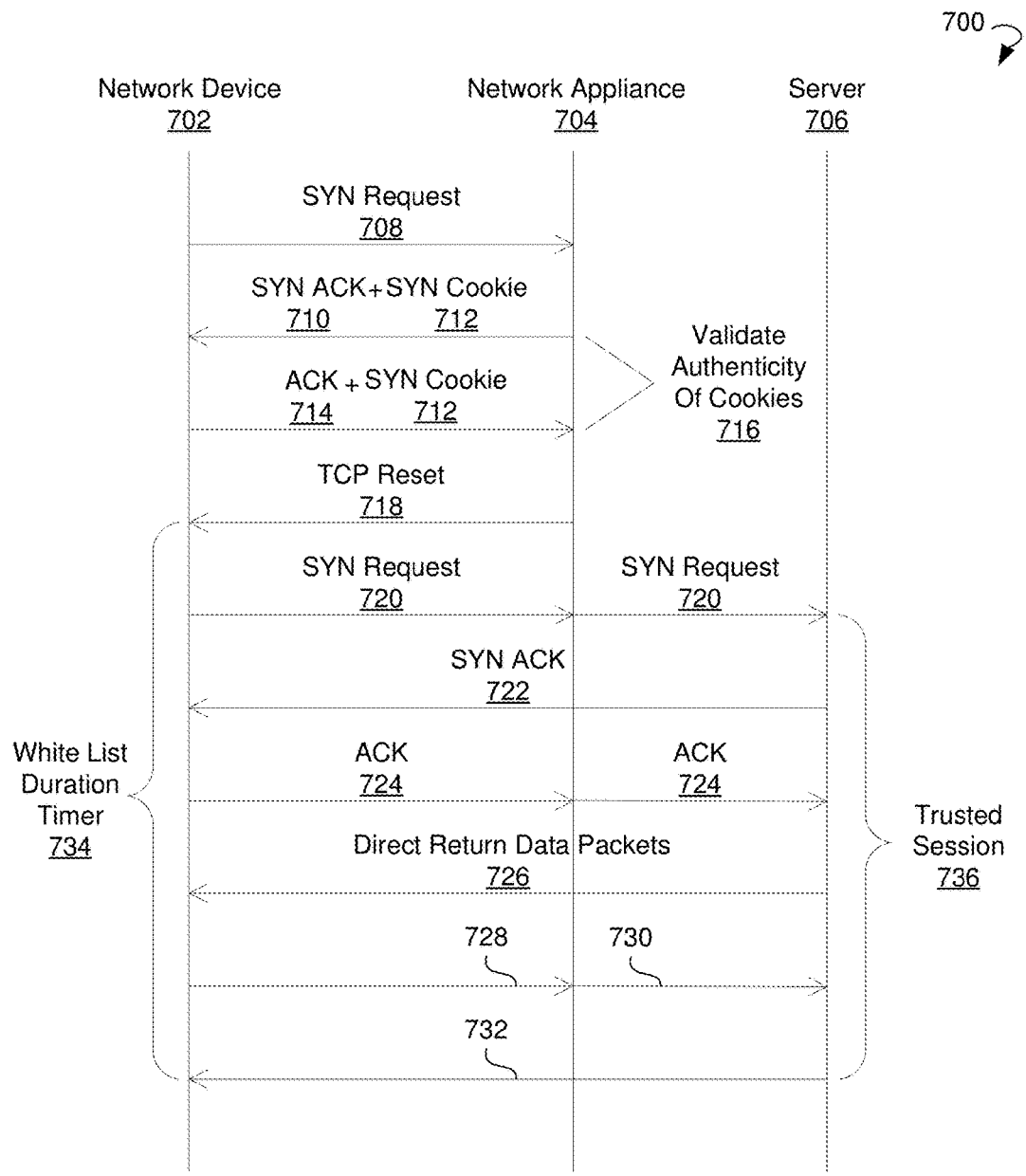
FIG. 7 is a schematic diagram showing a communication between a network device and a server using a system for mitigating a denial of service attack.

FIG. 7 is a schematic diagram 700 showing a communication between a network device 702 and a server 706 using a system for mitigating a denial of service attack. A network appliance 704 may include a network module, a storage module, a processor module, and an I/O module as shown on FIG. 3. Referring to FIG. 7, the network appliance 704 may receive from the network device 702 an initial SYN request 708 to establish a TCP session with the server 706. The network appliance 704 may generate a SYN cookie 712 and transmit a SYN ACK 710 including the SYN cookie 712 to the network device 702. The network appliance 704 may receive from the network device 702 an ACK 714 including the SYN cookie 712. The network appliance 704 may validate 716 the authenticity of cookies. The network appliance 704 may transmit a TCP reset 718 command to the network device. The network appliance 704 may receive a further SYN request 720 from the network device 702 to establish the new TCP session. The network appliance 704 may determine that the network device 702 is trusted and start trusted session 736. The network device 702 may try reestablishing the TCP session with the server 706 by transmitting a further SYN request shown as a SYN request 720. The network appliance 704 may receive the SYN request 720 from the network device 702 and transmit the SYN request 720 to the server 706. The server 706 may respond to the SYN request 720 from the network device 702 by sending a SYN ACK 722 directly to the network device 702. The network device 702 may respond to the SYN ACK 722 by sending an ACK 724. The network appliance 704 may receive the ACK 724 from the network device 702 transmit the ACK 724 to the server 706. The network device 702 may establish a trusted data connection between the network device 702 and the server 706 for the predetermined period of time 734, in which return data packets 726 from the server 706 are directed directly to the network device 702 without being processed by the network appliance 704. When the trusted data connection between the network device 702 and the server 706 is established, the network device 702 may send data packets 728 to the server 706. The network appliance 704 may intercept the data packets 728 and send them as data packets 730 to the server 706. The data packets 732 sent by the server 706 to the network device 702 may be directed by the network appliance 704 directly to the network device 702 without processing.

Figure 8:
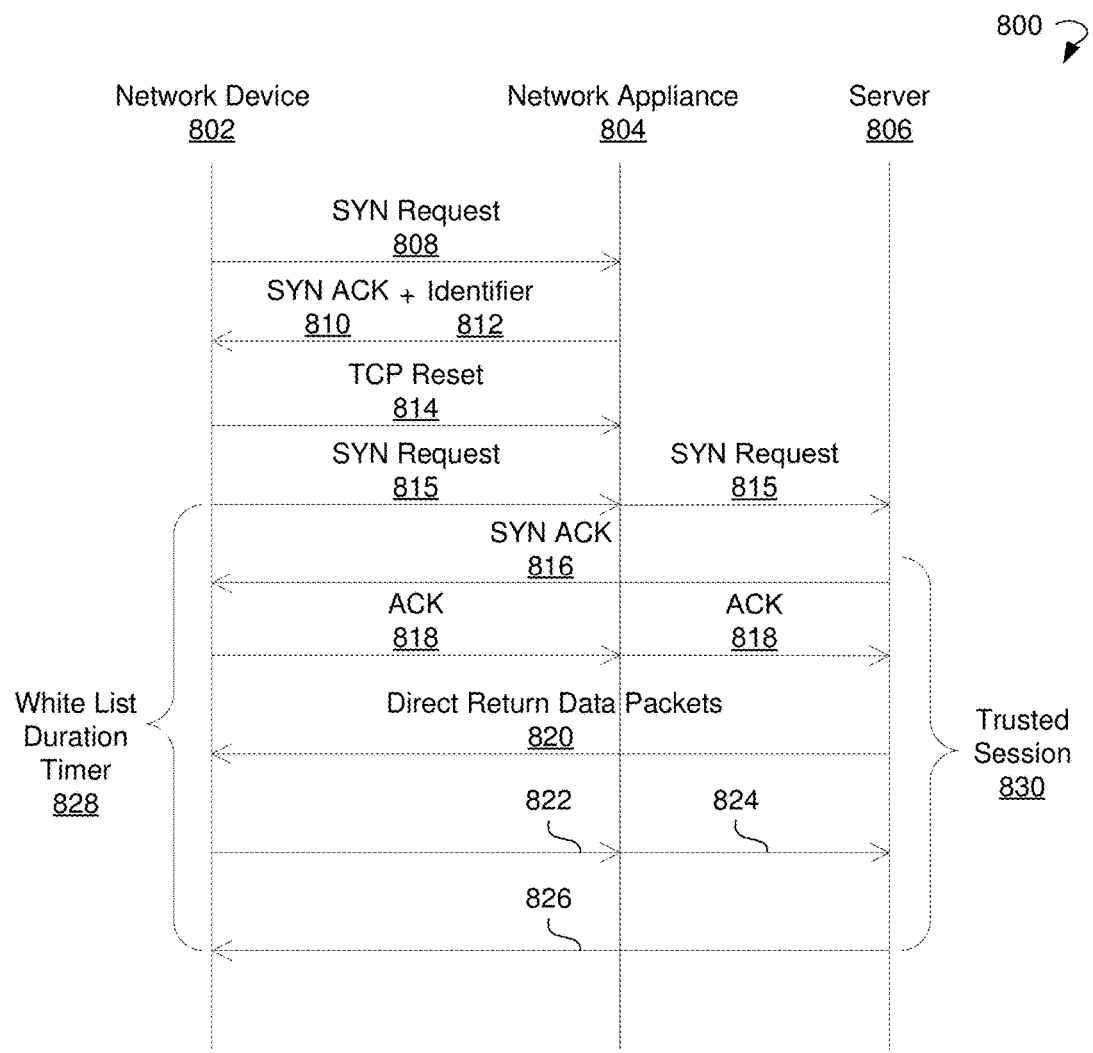
FIG. 8 is a schematic diagram showing a communication between a network device and a server using a system for mitigating a denial of service attack.

FIG. 8 is a schematic diagram 800 showing a communication between a network device 802 and a server 806 using a system for mitigating a denial of service attack. A network appliance 804 may include a network module, a storage module, a processor module, and an I/O module as shown on FIG. 3. Referring to FIG. 8, the network appliance 804 may receive from the network device 802 an initial SYN request 808 to establish a TCP session with the server 806. The network appliance 804 may transmit a reset cookie. The reset cookie may include a SYN ACK 810 including an identifier 812 unexpected by the network device 802 to the network device 802. Responsive to the reset cookie, the network appliance 804 may receive from the network device 802 a TCP reset command 814. The network appliance 804 may determine that the network device 802 is trusted and start trusted session 830. The network device 802 may retry establishing the TCP session with the server 806 by sending a further SYN request shown as a SYN request 815. The network appliance 804 may receive the SYN request 815 and transmit the SYN request 815 to the server 806. The server 806 may respond to the SYN request 815 by transmitting a SYN ACK 816 directly to the network device 802. The network device 802 may respond to the SYN ACK 816 by sending an ACK 818. The network appliance 804 may receive from the network device 802 the ACK 818 and transmit the ACK 818 to the server 806. The network appliance 804 may establish a trusted data connection between the network device 802 and the server 806 for the predetermined period of time 828, where return data packets 820 from the server 806 are directed directly to the network device 802 without being processed by the network appliance 804. When the trusted data connection between the network device 802 and the server 806 is established, the network device 802 may send data packets 822 to the server 806. The network appliance 804 may intercept the data packets 822 and send them as data packets 824 to the server 806. The data packets 826 sent by the server 806 to the network device 802 may be directed by the network appliance 804 directly to the network device 802 without processing.

Figure 9:
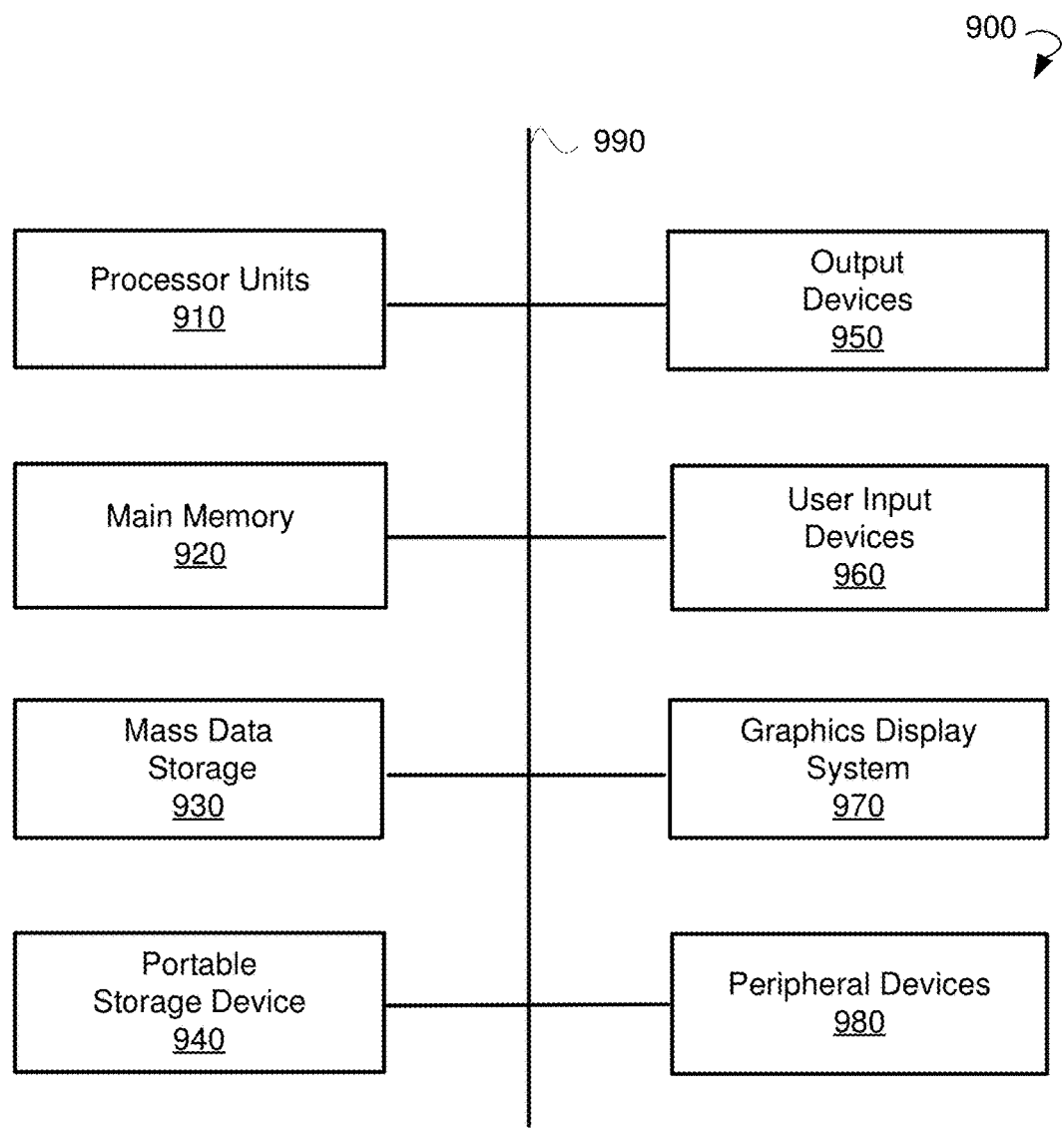
FIG. 9 is a diagrammatic representation of a computing device for a machine, within which a set of instructions for causing the machine to perform any one or more of the methodologies discussed herein can be executed.

FIG. 9 illustrates a computer system 900 that may be used to implement embodiments of the present disclosure, according to an example embodiment. The computer system 900 may serve as a computing device for a machine, within which a set of instructions for causing the machine to perform any one or more of the methodologies discussed herein can be executed. The computer system 900 can be implemented in the contexts of the likes of computing systems, networks, servers, or combinations thereof. The computer system 900 includes one or more processor units 910 and main memory 920. Main memory 920 stores, in part, instructions and data for execution by processor units 910. Main memory 920 stores the executable code when in operation. The computer system 900 further includes a mass data storage 930, a portable storage device 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor units 910 and main memory 920 are connected via a local microprocessor bus, and mass data storage 930, peripheral devices 980, the portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor units 910. Mass data storage 930 stores the system software for implementing embodiments of the present disclosure for purposes of loading that software into main memory 920.

The portable storage device 940 operates in conjunction with a portable non-volatile storage medium, such as a floppy disk, a compact disk, a Digital Versatile Disc (DVD), or USB storage device, to input and output data and code to and from the computer system 900. The system software for implementing embodiments of the present disclosure is stored on such a portable medium and input to the computer system 900 via the portable storage device 940.

User input devices 960 provide a portion of a user interface. User input devices 960 include one or more microphones; an alphanumeric keypad, such as a keyboard, for inputting alphanumeric and other information; or a pointing device, such as a mouse, a trackball, stylus, or cursor direction keys. User input devices 960 can also include a touchscreen. Additionally, the computer system 900 includes output devices 950. Suitable output devices include speakers, printers, network interfaces, and monitors.

Graphics display system 970 includes a liquid crystal display or other suitable display device. Graphics display system 970 receives textual and graphical information and processes the information for output to the display device. Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for mitigating a denial of service attack have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for determining that a network device is trusted, the system comprising:
   a network module configured to:
   receive a request from a network device to establish a data connection between the network device and a server, wherein the receiving of the request from the network device includes receiving, from the network device, an initial synchronization (SYN) request to establish a Transmission Control Protocol (TCP) session;
   determine that the data connection associated with the TCP session between the network device and the server is trusted based on a determination that the network device is trusted, the determination being reached by generating a SYN cookie, transmitting a SYN acknowledgment (ACK) including the SYN cookie to the network device, responsive to the SYN ACK, receiving from the network device a network device ACK, and determining that the network device ACK includes the SYN cookie, thereby validating authenticity of the SYN cookie;
   transmit an unexpected identifier to the network device, the unexpected identifier causing the network device to terminate the TCP session and to start a new TCP session;
   receive, from the network device, a further SYN request to establish the new TCP session; and establish a trusted data connection associated with the new TCP session between the network device and the server, wherein data packets from the server are routed directly to the network device without being processed by the network module;

a storage device operable to store a whitelist associated with a plurality of trusted network devices; and a processor operable to:
   determine that the network device is trusted; and
   based on the determination, associate the network device with the whitelist for a predetermined period of time.

2. The system of claim 1, wherein lack of the network device ACK is indicative of the network device being untrusted.

3. The system of claim 1, wherein the SYN cookie includes an encryption of an identifier associated with the SYN.

4. The system of claim 1, wherein the unexpected identifier is included in a reset cookie, wherein the network module is further configured to, responsive to the reset cookie, receive, from the network device a reset command, the reset command being generated responsive to the unexpected identifier.

5. The system of claim 4, wherein establishing the data connection between the network device and the server includes:
   receiving, by the network module, a further SYN request from the network device; and
   based on the determining that the network device is trusted, transmitting, by the network module, the further SYN request to the server.

6. The system of claim 1, wherein the processor is further operable to determine that the predetermined period of time has expired and, based on the determination, removing, by the processor, the network device from a white list, thereby flagging, by processor, the network device as untrusted.

7. The system of claim 1, wherein the network module is further configured to direct return data packets from the server directly to the network device without being processed by the network module.

8. The system of claim 1, wherein no SYN cookies are sent by the network module to the network device while the network device is whitelisted.

9. A method for determining that a network device is trusted, the method comprising:
   receiving, by a network appliance, a request from a network device to establish a data connection with a server, wherein the receiving of the request from the network device includes receiving, by the network appliance, from the network device, an initial synchronization (SYN) request to establish a Transmission Control Protocol (TCP) session;
   determining, by the network appliance, that the data connection associated with the TCP session between the network device and the server is trusted based on a determination that the network device is trusted, the determination being made by generating a SYN cookie, transmitting a SYN acknowledgement (ACK) including the SYN cookie to the network device, responsive to the SYN ACK, receiving from the network device a network device ACK, and determining that the network device ACK includes the SYN cookie, thereby validating authenticity of the SYN cookie;
   responsive to the determination, whitelisting, by the network appliance, the network device for a predetermined period of time; and
   transmitting, by the network appliance, an unexpected identifier to the network device, the unexpected identifier causing the network device to terminate the TCP session and to start a new TCP session;
   receiving, by the network appliance, from the network device, a further SYN request to establish the new TCP session;
   determining, by the network appliance, that the network device is whitelisted; and
   establishing, by the network appliance, a trusted data connection associated with the new TCP session between the network device and the server, wherein data packets from the server are routed directly to the network device without being processed by the network appliance.

10. The method of claim 9 wherein lack of the network device ACK is indicative of the network device being untrusted.

11. The method of claim 9, wherein the unexpected identifier is included in a reset cookie,
   the method further comprising:
   responsive to the reset cookie, receiving, by the network appliance, from the network device, a reset command, the reset command being generated responsive to the unexpected identifier.

12. The method of claim 11, wherein the establishing the data connection between the network device and the server includes:
   receiving, by the network appliance, a further SYN request from the network device; and
   based on the determining that the network device is trusted, transmitting, by the network appliance, the further SYN request to the server.

13. The method of claim 9, further comprising determining that the predetermined period of time has expired and, based on the determination, removing the network device from a white list, thereby flagging the network device as untrusted.

14. The method of claim 9, further comprising directing, by the network appliance, return data packets from the server directly to the network device without being processed by the network appliance.

15. The method of claim 9, wherein no SYN cookies are sent to the network device while the network device is whitelisted.

16. A system for determining that a network device is trusted, the system comprising:
   a network module configured to:
      receive a request from a network device to establish a data connection between the network device and a server, wherein the receiving of the request from the network device includes receiving, by the network module, from the network device, an initial synchronization (SYN) request to establish a Transmission Control Protocol (TCP) session; and
      determine that the data connection associated with the TCP session between the network device and the server is trusted based on a determination that the network device is trusted;
   a storage device operable to store a whitelist associated with a plurality of trusted network devices; and
   a processor operable to:
      determine that the network device is trusted;
      based on the determination, associate the network device with the whitelist for a predetermined period of time;

wherein the determining, by the processor, that the network device is trusted includes:
receiving, by the network module, from the network device, an initial synchronization (SYN) request to establish a Transmission Control Protocol (TCP) session;
generating, by the processor module, a SYN cookie;
transmitting, by the network module, a SYN acknowledgement (ACK) including the SYN cookie to the network device;
responsive to the SYN ACK, receiving from the network device, by the network module, a network device ACK;
determining, by the processor, that the network device ACK includes the SYN cookie; and
based on the determining, validating, by the processor, authenticity of the SYN cookie; and
wherein the establishing, by the network module, the data connection by the network module between the network device and the server includes:

based on the determination that the network device is trusted, transmitting, by the network module, an unexpected identifier to the network device, the unexpected identifier causing the network device to terminate the TCP session and to start a new TCP session;

receiving, by the network module, from the network device, a further SYN request to establish the new TCP session;

determining, by the processor, that the network device is whitelisted; and based on the determination, establishing, by the network module, a trusted data connection associated with the new TCP session between the network device and the server for the predetermined period of time.

* * * * *